(12) United States Patent
Arya et al.

(10) Patent No.: US 12,281,852 B2
(45) Date of Patent: Apr. 22, 2025

(54) ENERGY STORAGE SYSTEM AND COOLING ARRANGEMENT FOR A VEHICLE

(71) Applicant: Volvo Truck Corporation, Gothenburg (SE)

(72) Inventors: Pranav Arya, Lindome (SE); Ubaldo Tiberi, Gothenburg (SE); Ricard Blanc, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 406 days.

(21) Appl. No.: 17/954,586

(22) Filed: Sep. 28, 2022

(65) Prior Publication Data

US 2023/0105750 A1    Apr. 6, 2023

(30) Foreign Application Priority Data

Oct. 5, 2021 (EP) .................................... 21200843

(51) Int. Cl.

| F28D 20/00 | (2006.01) |
| B60H 1/00 | (2006.01) |
| B60K 6/08 | (2006.01) |
| B60L 58/26 | (2019.01) |
| B60L 58/33 | (2019.01) |
| F16D 61/00 | (2006.01) |

(52) U.S. Cl.
CPC .......... *F28D 20/0034* (2013.01); *B60L 58/26* (2019.02); *B60L 58/33* (2019.02); *B60H 1/00278* (2013.01); *B60K 6/08* (2013.01); *F16D 61/00* (2013.01)

(58) Field of Classification Search
CPC ...... F28D 20/0034; B60L 58/26; B60L 58/33; B60H 1/00278; B60K 6/08; F16D 61/00; B60T 2270/60
USPC .......................................................... 165/44
See application file for complete search history.

(56) References Cited

U.S. PATENT DOCUMENTS

2017/0309976 A1    10/2017  Lambert et al.

FOREIGN PATENT DOCUMENTS

| DE | 112018004389 T5 | 5/2020 | |
| WO | WO-2019074419 A1 * | 4/2019 | ............. B60T 1/087 |

OTHER PUBLICATIONS

Extended European Search Report for European Patent Application No. 21200843.7, mailed Apr. 7, 2022, 9 pages.

* cited by examiner

*Primary Examiner* — Steve S Tanenbaum
(74) *Attorney, Agent, or Firm* — Withrow & Terranova, PLLC

(57) ABSTRACT

An energy storage tank defining a tank volume for heat transfer fluid and comprising a partition dividing the tank volume into a first volume and a second volume, wherein the partition is movable to/from any position between a minimum energy storage position corresponding to a minimum second volume, and a maximum energy storage position corresponding to a maximum second volume, the energy storage tank further comprising a biasing device being arranged such that movement of the partition away from the minimum energy storage position corresponds to storing energy in the biasing device, and movement towards the minimum energy storage position corresponds to releasing energy from the biasing device.

19 Claims, 5 Drawing Sheets

ENERGY STORAGE SYSTEM AND COOLING ARRANGEMENT FOR A VEHICLE

RELATED APPLICATIONS

The present application claims priority to European Patent Application No. 21200843.7, filed on Oct. 5, 2021, and entitled "ENERGY STORAGE SYSTEM AND COOLING ARRANGEMENT FOR A VEHICLE," which is incorporated herein by reference in its entirety.

TECHNICAL FIELD

The present disclosure relates an energy storage system for a vehicle, to a cooling arrangement for a vehicle comprising an energy storage system, and to a method for energy storage of recuperation energy from an energy recuperating arrangement in a vehicle, such as from a braking arrangement in a vehicle.

BACKGROUND

In a vehicle, for example a heavy vehicle such as a truck or bus, a need for recuperating energy from various devices or arrangements in the vehicle may arise. One example is braking energy released during regenerative braking of the vehicle.

There is a general desire to recuperate energy wherever possible in a vehicle.

The need for recuperating energy arises in vehicles with combustion engines as well as in wholly or partly electric vehicles, comprising an electric machine and/or an electric supply system for propulsion of the vehicle or for assisting the propulsion of the vehicle. For example, in vehicles having a battery, it is possible to recuperate energy e.g. by storage of energy in the battery Further, in vehicles having electric energy supply systems in the form of fuel cell systems, there is a frequent need for cooling the fuel cell system in order to maintain a nominal operation temperature of the fuel cell system.

In view of the above, there is a need for alternatives and/or improvements relating to the recuperation of energy in vehicles, such as the recuperation of braking energy in vehicles. Further, there is a need for such alternatives and/or improvements that are available for vehicles comprising electrical energy supply systems. Another need is for alternatives and/or improvements relating to the cooling of various arrangements in a vehicle, in particular for cooling of a fuel cell system in a vehicle.

SUMMARY

An object of the invention is to provide an alternative and/or an improvement relating to one or more of the needs as set out in the above.

The object is achieved by an energy storage system for a vehicle.

Thus, there is provided an energy storage system for a vehicle, comprising an energy storage tank defining a tank volume for a heat transfer fluid, and comprising a partition dividing the tank volume into a first volume and a second volume, wherein the partition is movable to/from any position between a minimum energy storage position corresponding to a minimum second volume, and a maximum energy storage position corresponding to a maximum second volume, the energy storage tank further comprising a biasing device being arranged such that movement of the partition away from the minimum energy storage position corresponds to storing energy in the biasing device, and movement towards the minimum energy storage position corresponds to releasing energy from the biasing device; the energy storage system further comprising
   a heat transfer fluid duct connecting the first volume and the second volume, and
   a heat transfer arrangement arranged for altering the temperature of the heat transfer fluid from a first temperature when in the first volume to a second temperature when in the second volume
and the energy storage system further comprising a fluid control assembly for providing a pressure implying a flow of the heat transfer fluid from the first volume to the second volume via the heat transfer fluid duct.

Thus, the proposed energy storage system provides for storage of energy in two forms using the energy storage tank. First, thermal energy may be stored by means of the heat transfer arrangement heating/cooling the heat transfer fluid stored in the second volume. Second, mechanical energy may be stored by means of the biasing device storing energy when moved towards the maximum energy storage position as heat transfer fluid flows into the second volume.

Accordingly, recuperated energy may be used for driving the heat transfer arrangement and/or the fluid control assembly, resulting in the recuperated energy being stored in the energy storage tank in the form of thermal energy and energy stored by the biasing device.

Optionally, the heat transfer arrangement is arranged along the heat transfer fluid duct. Thus, efficient altering of the temperature of the heat transfer fluid may take place along the passage of the heat transfer fluid flow from the first volume to the second volume.

Optionally, the fluid control assembly and/or heat transfer arrangement are configured to be driven by recuperated energy from an energy recuperating arrangement.

Optionally, the energy recuperating arrangement is a braking arrangement. Thus, the energy storage system may be used for recuperating the braking energy from a braking arrangement in a vehicle, such as in a vehicle comprising an electric machine and/or an electric supply system for propulsion of the vehicle or for assisting the propulsion of the vehicle.

Optionally, the one or more heat transfer arrangement is a cooling arrangement for cooling the heat transfer fluid. This implies that the heat transfer fluid in the second volume has a lower temperature than the heat transfer fluid in the first volume. In other words, the maximum energy storage position corresponding to a maximum second volume corresponds to a maximum cool storage position. This enables use of the stored thermal energy for cooling, such as in a cooling arrangement, for example a cooling arrangement in a vehicle.

In other options however, the one or more heat transfer arrangement may be a heating arrangement for heating the heat transfer fluid. This implies that the heat transfer fluid in the second volume has a higher temperature than the heat transfer fluid in the first volume, and that the maximum energy storage position corresponds to a maximum heat storage position. In this case, the stored thermal energy may instead be used for heating.

Optionally, the heat transfer arrangement comprises one or more cooling elements.

Optionally, at least one of the one or more cooling elements is a compressor for cooling the heat transfer fluid. Thus, in this example, the compressor may be driven by recuperated energy.

As mentioned above, the fluid control assembly is arranged for providing a pressure implying a flow of heat transfer fluid from the first volume to the second volume via the one or more heat transfer elements. Thus, the fluid control assembly may be any device suitable for providing a pressure implying such a flow. The pressure thus needs to overcome a counter-pressure provided by the biasing device of the energy storage tank, so as to enable flow of heat transfer fluid from the first volume to the second volume while moving the partition towards the maximum energy storage position and storing energy in the biasing device.

Optionally, the fluid control assembly may be wholly or partly driven by recuperated energy.

For example, the fluid control assembly may comprise a pump. As such, the pump may be driven by recuperated energy.

Optionally or additionally, the fluid control assembly may comprise an actuator. Such an actuator may be arranged to act on the partition and/or the biasing device so as act in a direction for moving the partition towards the maximum energy storage position and storing energy in the biasing device.

Optionally, the energy storage system comprises a control unit adapted to control the fluid control assembly and/or heat transfer arrangement.

In a second aspect, the object is achieved by a cooling arrangement. Accordingly, there is provided a cooling arrangement comprising an energy storage system, the cooling arrangement further comprising a cooling system for cooling one or more devices using the heat transfer fluid, and a valve arrangement for controlling a flow of heat transfer fluid from the second volume to the first volume via the cooling system.

Optionally, the cooling system comprises a cooling system fluid duct connecting the second volume and the first volume, wherein the one or more devices is/are arranged along the cooling system fluid duct.

The cooling system fluid duct may be at least partly separate from the heat transfer fluid duct of the energy storage system. With "at least partly separate" means that the cooling system fluid duct comprises at least a portion which is not also a part of the heat transfer fluid duct. In this case, the energy storage tank may for example be provided with a first volume inlet/outlet and a second volume inlet/outlet, wherein the inlet/outlets allow flow in different directions when used to provide the heat transfer fluid duct or the cooling system fluid duct, respectively.

Optionally, the cooling system fluid duct may be completely separate from the heat transfer fluid duct of the energy storage system. With "completely separate" is meant that the cooling system fluid duct comprises no portion which is also a part of the heat transfer fluid duct. In this case, the energy storage tank may for example be provided with a first volume outlet and a second volume inlet connected to the heat transfer fluid duct, and with a first volume inlet and a second volume outlet connected to the cooling system fluid duct. Thus, by the separate ducts, each duct will allow transfer fluid flow in one direction only, hence facilitating arrangements of valves, pumps etc. along the ducts.

Optionally, one of the one or more devices is an electrical energy supply system, such as a fuel cell system. Thus, the cooling system may be a cooling system for cooling at least one fuel cell system using the heat transfer fluid.

Optionally, the cooling system may comprise a control unit adapted to control the valve arrangement. For example, as mentioned in the above, the energy storage system may comprise a control unit, and this control unit may be arranged so as to control also the valve arrangement of the cooling system.

In a third aspect, the object is achieved by a method for energy storage of recuperation energy. Hence, there is provided a method for energy storage of recuperation energy from an energy recuperating arrangement, in an energy storage system according to the first aspect and/or a cooling arrangement according to the second aspect. The method comprises:
    using the recuperation energy for driving the fluid flow control assembly to provide a heat transfer fluid flow from the first volume to the second volume, and/or
    using the recuperation energy for driving the heat transfer arrangement to alter the temperature of the heat transfer fluid.

In a fourth aspect, there is provided a method for cooling one or more devices in a cooling arrangement according to the second aspect, the method comprising:
    controlling the valve arrangement to allow flow of heat transfer fluid from the second volume to the first volume of the energy storage system via the cooling system.

In a fifth aspect, the object is achieved by a method for controlling a cooling arrangement according to the second aspect. Hence, there is provided a method for controlling a cooling arrangement according to the second aspect comprising
    when recuperation energy from an energy recuperating arrangement is available, operating the cooling arrangement in an energy recuperation mode by performing the method according to the third aspect, and
    when a need for cooling the one or more devices is present, operating the cooling arrangement in a cooling mode by performing the method according to the fourth aspect.

The method may involve selectively running one of the energy recuperation mode and the cooling mode.

The method may comprise using information indicative of the availability of recuperation energy as input for determining when to operate the cooling arrangement in the energy recuperation mode.

The method may comprise using information indicative of the need for cooling the one or more devices as input for determining when to operate the cooling arrangement in the cooling mode.

Further, the method may comprise operating the cooling arrangement in the energy recuperation mode while the partition is in other than the maximum energy storage position.

Further, the method may comprise operating the cooling arrangement in the cooling mode while the partition is in other than the minimum energy storage position.

Hence, the method may comprise using information regarding the position of the partition in the energy storage tank as input.

In a sixth aspect, the object is achieved by a control unit. Hence, there is provided a control unit configured for performing any one of the methods described herein.

In a seventh aspect, the object is achieved by a vehicle comprising an energy storage system according to the first aspect and/or a cooling arrangement according to the second aspect, wherein preferably the fluid control assembly and/or cooling arrangement are configured to be driven by recuperated energy from a braking arrangement of the vehicle.

Optionally, the vehicle comprises and/or is arranged to communicate with a control unit according to the sixth aspect.

Features and advantages as described in relation to the disclosure in the above will be equally applicable to the application of the method for other vehicle arrangements than those described herein.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
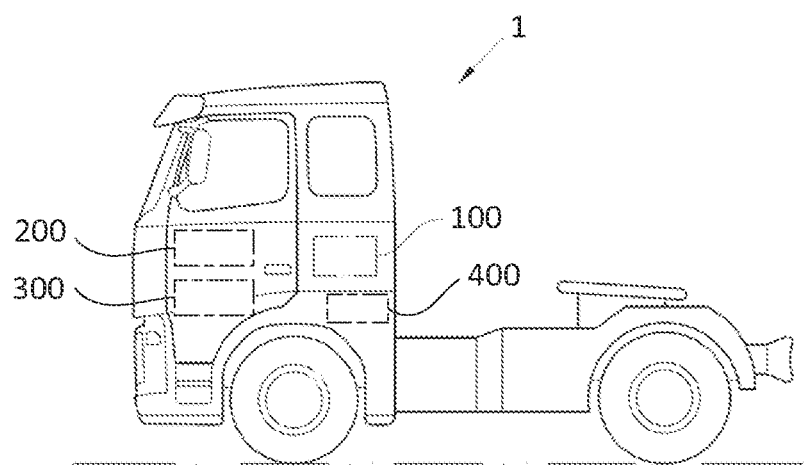
FIG. 1 is a schematic view of an example of a vehicle according to the seventh aspect for which the first to sixth aspects may be implemented.

FIG. 1 illustrates a variant of a vehicle 1 as disclosed herein for which the invention as disclosed herein may be implemented. The invention can be applied in any vehicle, such as in a boat or car. For example, the invention can be applied in heavy-duty vehicles, such as trucks, buses and construction equipment. Although the invention will be described herein with respect to a truck, the invention is not restricted to this particular vehicle, but may also be used in other vehicles such as working machines or buses.

During operation of a vehicle such as the vehicle 1, the need for recuperating energy from various systems and/or devices in the vehicle 1 may occur. For example, and as schematically illustrated in FIG. 1, the vehicle 1 may comprise a braking system 400 which, when in use for braking, will absorb energy which may need to be either recuperated or dissipated.

The vehicle 1 may comprise a propulsion system comprising a combustion engine and/or an electrical energy supply system such as a battery and/or a fuel cell system. Purely by example, in the illustrated vehicle 1, the propulsion system comprises a fuel cell system 300.

Also, in a vehicle 1 such as the illustrated vehicle, a need for cooling various devices will occur during operation of the vehicle 1. To this end, the vehicle 1 may comprise a cooling system 200 using a heat transfer fluid to cool one or more devices in the vehicle 1.

For example, for a vehicle 1 comprising a fuel cell system 300, as exemplified in FIG. 1, there is often a need for cooling the fuel cell system 300 during operation of the vehicle 1.

Further, the vehicle 1 comprises an energy storage system 100 as will be described in the below. For example, and as illustrated in FIG. 1, the energy storage system 100 may be used in a cooling arrangement together with the cooling system 200, for recuperating energy from a system in the vehicle 1 such as the braking system 400. Further, the cooling system 200 may be arranged for cooling the fuel cell system 300, as will also be described in the below.

Figure 2:
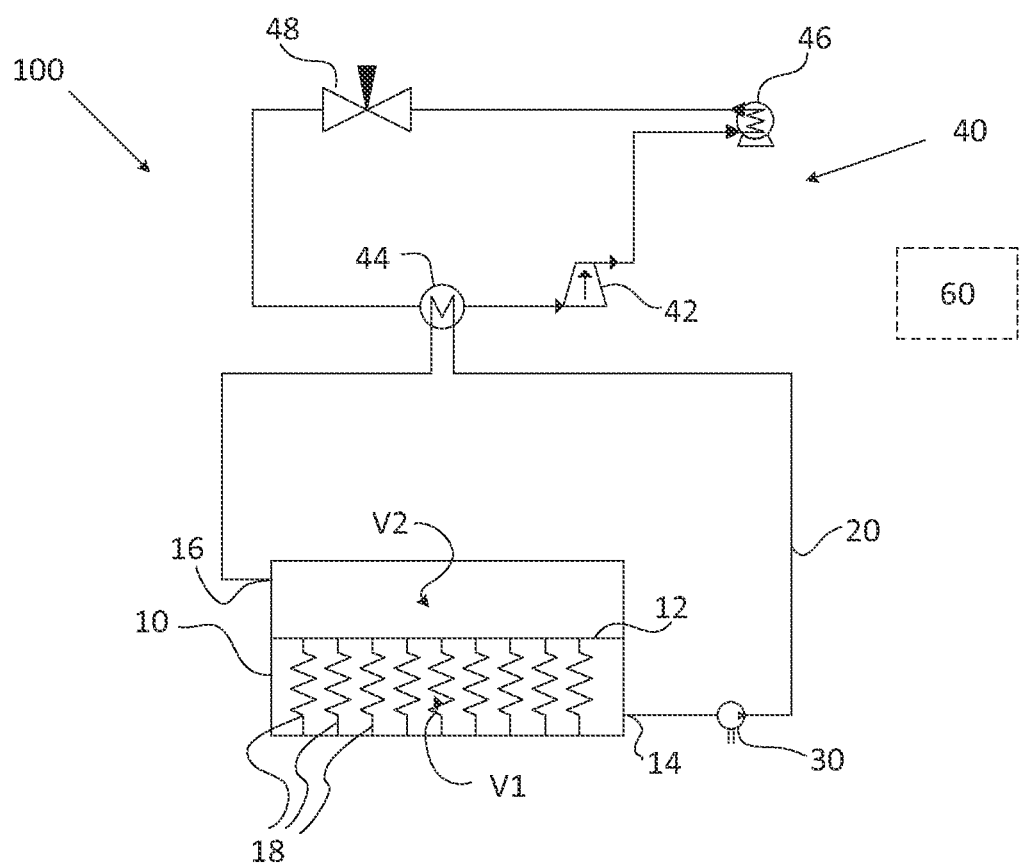
FIG. 2 schematically illustrates a variant of an energy storage system according to the first aspect.

FIG. 2 illustrates schematically an example of an energy storage system 100 according to the first aspect, which may be used for recuperating energy from a system such as a braking system 400 in a vehicle 1.

The energy storage system 100 comprises an energy storage tank 10 defining a tank volume for a heat transfer fluid. The energy storage tank 10 comprises a partition 12 dividing the tank volume into a first volume V1 and a second volume V2.

The partition 12 is movable to/from any position between a minimum energy storage position corresponding to a minimum second volume V2, and a maximum energy storage position corresponding to a maximum second volume V2.

The tank 10 as such, and the first and second volumes V1, V2 are suitably isolated so as to enable the heat transfer fluid in said first and second volumes V1, V2, respectively, to be maintained at a relatively constant temperature over substantial periods of time.

The energy storage tank 10 further comprises a biasing device 18 being arranged such that movement of the partition 12 away from the minimum energy storage position corresponds to storing energy in the biasing device 18, and movement towards the minimum energy storage position corresponds to releasing energy from the biasing device 18.

For example, the biasing device 18 may comprise one or more spring element(s) arranged so as to bias the partition 12 towards the minimum energy storage position. Hence, the spring element(s) are arranged such that movement of the partition 12 away from the minimum energy storage position corresponds to storing energy in the biasing device 18, and movement towards the minimum energy storage position corresponds to releasing energy from the biasing device 18, as outlined in the above.

The spring element(s) may for example be one or more compression springs or tension springs.

The energy storage system 100 further comprises a heat transfer fluid duct 20 connecting the first volume V1 and the second volume V2.

For example, and as illustrated in FIG. 2, the heat transfer fluid duct 20 may be communicating with the first volume V1 via a first volume inlet/outlet 14 and with the second volume V2 via a second volume inlet/outlet 16.

Also, the energy storage system 100 comprises a fluid control assembly 30 for providing a pressure implying a flow of heat transfer fluid from the first volume V1 to the second volume V2 though the heat transfer fluid duct 20.

The pressure provided by the fluid control assembly 30 will work against the bias of the biasing device 18 so as to move the partition 12 towards the maximum energy storage position while storing energy in the biasing device 18. Accordingly, the fluid control assembly 30 provides for the storage of energy in mechanical form in the biasing device 18. As such, the fluid control assembly 30 may be arranged to be driven by recuperated energy from an energy recuperation arrangement. For example, the fluid control assembly 30 may be driven by energy recuperated from a braking arrangement such as the braking arrangement 400 in the vehicle 1 of FIG. 1.

The fluid control assembly 30 may for example, and as in the variant of FIG. 2, be a pump. The pump may be adapted to provide a pressure of the heat transfer fluid being sufficient to accomplish the movement of the partition 12 towards the maximum energy storage position while storing energy in the biasing device 18.

Also, the energy storage system 100 comprises a heat transfer arrangement 40 arranged for altering the temperature of the heat transfer fluid from a first temperature when in the first volume V1 to a second temperature when in the second volume V2. The flow of heat transfer fluid from the first volume V1 to the second volume V2 resulting by the action of the fluid control assembly 30 will flow through the heat transfer fluid duct 20 via the heat transfer arrangement 40, thus allowing for the storage of energy in the form of thermal energy in the heat transfer fluid. As such, the heat transfer arrangement 40 may be arranged to be driven by recuperated energy from an energy recuperating arrangement. For example, the heat transfer arrangement 40 may be driven by energy recuperated from a braking arrangement such as the braking arrangement 400 in the vehicle 1 of FIG. 1.

The thermal energy may be used by exploiting a temperature difference between the heat transfer fluid of the second volume V2 and another device, e.g. a device to be cooled/heated by the heat transfer fluid from the second volume V2. As such, storage of thermal energy may be made by heating the heat transfer fluid, i.e. by altering the temperature from a first temperature when in the first volume V1 to a second temperature when in the second volume V2, and where the second temperature is higher than the first temperature. Alternatively, the storage of thermal energy may be made by cooling the heat transfer fluid, i.e. where the second temperature is lower than the first temperature. As will be described in the below, the alternative to cool the heat transfer fluid may be particularly useful when combined with a cooling system for use in a vehicle.

The heat transfer arrangement 40 may be arranged anywhere allowing for altering of the temperature of the heat transfer fluid in or flowing to the second volume V2, in relation to the temperature of the heat transfer fluid in the first volume V1.

Optionally, and as in the variant illustrated in FIG. 2, the heat transfer arrangement is arranged along the heat transfer fluid duct 20. As such, the heat transfer arrangement may be arranged to alter the temperature of the heat transfer fluid when flowing through the heat transfer fluid duct towards the second volume V2. This arrangement allows for various options when it comes to realising the heat transfer arrangement 40.

That the heat transfer arrangement 40 is an arrangement for cooling the heat transfer fluid may be suitable for applications in which it is desired to use the cooled heat transfer fluid from the second volume V2 of the energy storage fuel tank 10 i.e. for a cooling arrangement, as will be described in the below with reference to FIG. 3. For example in vehicle applications, the storage system 100 enables storing recuperated energy from an energy recuperating arrangement, such as from a braking arrangement 400, and using the stored energy for cooling purposes such as in a cooling system 200 for cooling one or more devices, for example for cooling a fuel cell system 300.

However, as intimated in the above, the heat transfer arrangement 40 could in other applications be an arrangement for heating the heat transfer fluid, in which case the heat transfer fluid in the second volume V2 has a higher temperature than the heat transfer fluid in the first volume V1 (i.e. the second temperature is higher than the first temperature). In other words, the maximum energy storage position corresponding to a maximum second volume V2 corresponds to a maximum hot storage position. In this case, the heated heat transfer fluid from the second volume V2 of the energy storage fuel tank may be used i.e. for a heating arrangement.

The heat transfer arrangement 40 may, as exemplified in FIG. 2, comprise a heat transfer circuit arranged for altering the temperature of the heat transfer fluid in the heat transfer fluid duct 20 between the first volume V1 and the second volume V2. The heat transfer circuit may comprise one or more heat transfer elements.

For example, and as illustrated in FIG. 2, the heat transfer arrangement 40 may comprise a heat transfer circuit 40 for cooling the heat transfer fluid comprising one or more heat transfer elements such as an evaporator 44 and/or a compressor 42. For example, the heat transfer arrangement 40 may, as illustrated in FIG. 2, comprise an evaporator 44, a compressor 42, a condenser 46 and an expansion valve 48. One or more of the devices of the heat transfer arrangement 40 may be driven by recuperated energy, for example the compressor 42 in the exemplified heat transfer arrangement 40 may be driven by recuperated energy.

The energy storage system 100 may further comprise a control unit 60 adapted to control the fluid control assembly 30 and/or heat transfer arrangement 40. Such a control unit 60 may be arranged to communicate with the fluid control assembly 30 and/or heat transfer arrangement 40 via wired or wireless transmission. When the energy storage system 100 is arranged in a vehicle 1, the control unit 60 may be arranged in the vehicle 1 or remote from the vehicle 1.

For example, when the energy storage system 100 is arranged in a vehicle 1 comprising a braking system 400, the control unit 60 may be adapted to control the fluid control assembly 30 and/or heat transfer arrangement 40 to operate when energy from the braking system 400 is available, and/or not to operate when no energy from the braking system is available.

As explained in the above, storage of energy in the energy storage system 100 takes place by operating the heat transfer arrangement 40 and/or the fluid control arrangement 30. By operation of the fluid control arrangement 30, a fluid flow from the first volume V1 to the second volume V2 is created.

As such, there is provided a method for energy storage of recuperation energy from an energy recuperating arrangement, such as an energy recuperating arrangement in a vehicle, in an energy storage system 100, the method comprising: using the recuperation energy for driving the fluid flow control assembly to provide a heat transfer fluid flow from the first volume V1 to the second volume V2 and/or using the recuperation energy for driving the heat transfer arrangement 40 to alter the temperature of the heat transfer fluid.

As mentioned in the above, the energy storage system 100 may be connected e.g. to a cooling arrangement or to a heating arrangement arranged to use the thermal energy stored in the heat transfer fluid in the second volume V2.

Figure 3:
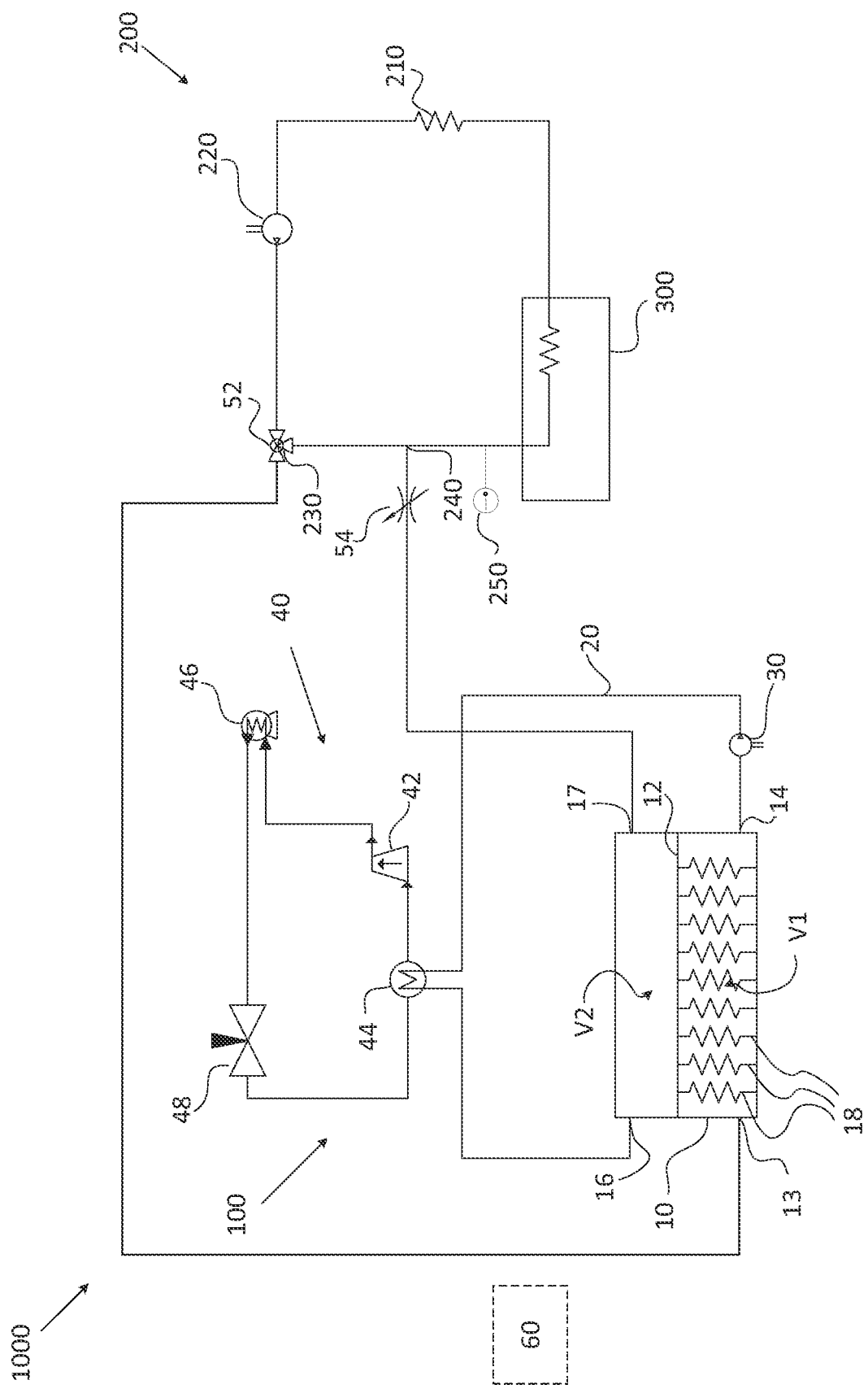
FIG. 3 schematically illustrates a variant of a cooling arrangement according to the second aspect, comprising the energy storage system of FIG. 2.

FIG. 3 illustrates a variant of a cooling arrangement 1000 comprising an energy storage system 100 as described in relation to FIG. 2, and a cooling system 200 for cooling one or more devices 300 using the heat transfer fluid, and a valve arrangement 52, 54 for controlling a flow of heat transfer fluid from the second volume V2 to the first volume V1 via the cooling system 200.

Thus, FIG. 3 illustrates an example of a cooling arrangement 1000 according to the second aspect. In such a cooling arrangement 1000, a cooling system 200 is arranged to use cooled heat transfer fluid stored in the second volume V2 of the storage tank 10 to cool one or more devices 300. The valve arrangement 52, 54 is arranged for controlling a flow of heat transfer fluid from the second volume V2 to the first volume V1, implying that the partition 12 moves in a direction away from the maximum energy storage position, releasing mechanical energy stored in the biasing means 18.

For example, and as illustrated in FIG. 3, the valve arrangement 52, 54 may comprise a first valve 52 controlling the outlet of heat transfer fluid from the cooling system 200 to the energy storage system 100, and a second valve 54 controlling the inlet of heat transfer fluid to the cooling system 200 from the energy storage system 100. As such, the first valve 52 is arranged to control the outlet of heat transfer fluid from the cooling system 200 to the first volume V1 of the storage tank 10, and/or the second valve 54 is arranged to control the inlet of heat transfer fluid to the cooling system 200 to the cooling system 200 from the second volume V2 of the storage tank 10.

The valves of the valve arrangement may be any valves as known in the art, for example, and as in the illustrated variant, the first valve 52 may be a three-way valve, and the second valve 54 may be a flow restrictor valve.

The cooling arrangement may further comprise a control unit 60, arranged to control the valve arrangement 52, 54 so as to control a flow of heat transfer fluid between the energy storage system 100 and the cooling system 200 for cooling the one or more devices 300. Advantageously, the control unit 60 for controlling the valve arrangement 52, 54 is also the control unit 60 for controlling the energy storage system 100.

The one or more devices 300 to be cooled may be any devices in a vehicle 1 which may require cooling.

For example, and as in the illustrated variant, at least one device 300 to be cooled may be an electric energy supply system such as a battery system and fuel cell system.

Hence, by means of the cooling system as described herein, there is provided a possibility of using recuperated energy, such as recuperated braking energy which can be recuperated when braking the vehicle, for cooling an electric energy supply system in the vehicle.

Thus, the cooling system provides an efficient solution alleviating two needs associated with vehicles comprising an electric energy supply system such as a fuel cell system, i.e. the need for recuperating energy and the need for cooling the electric energy supply system.

Figure 4:
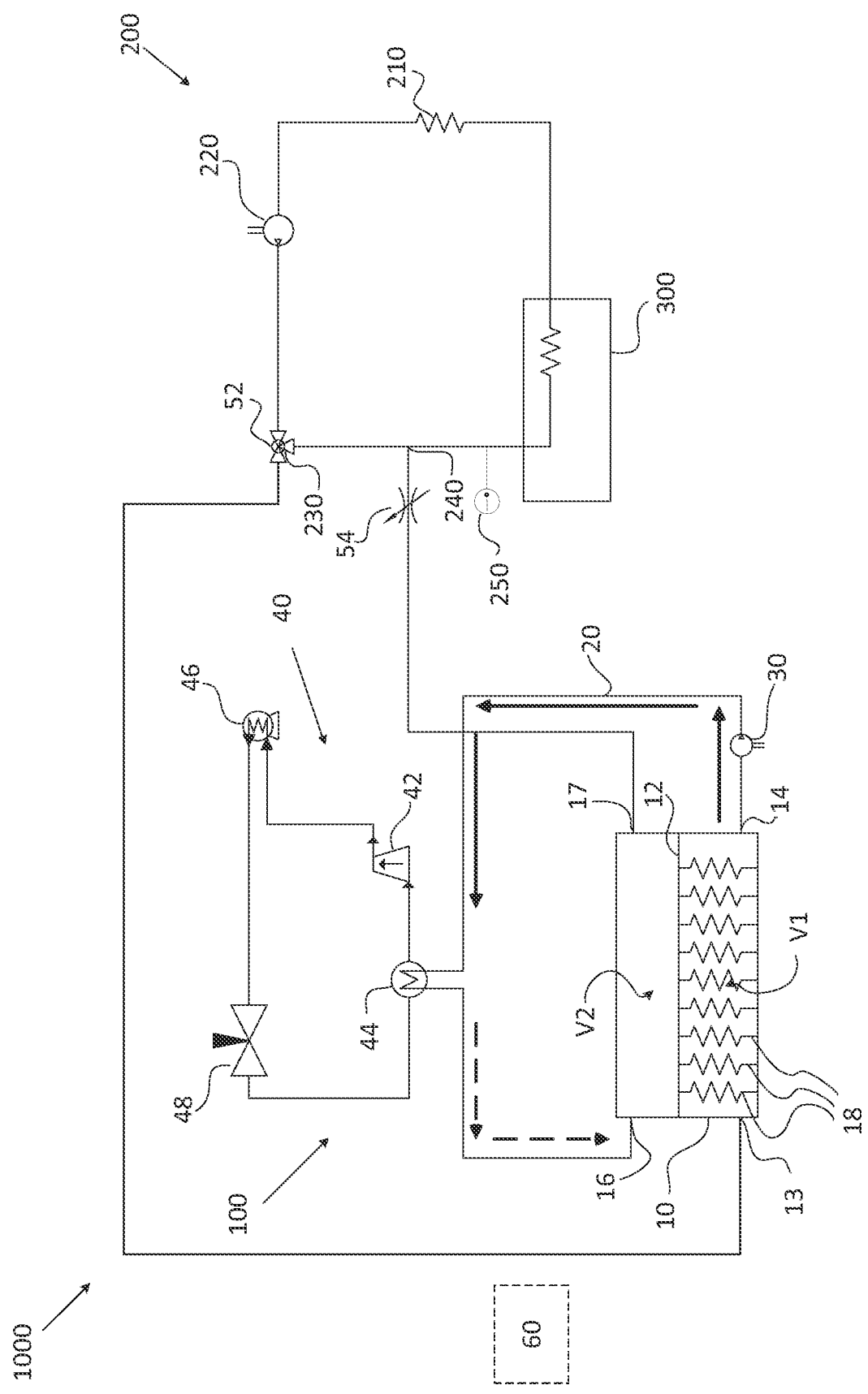
FIG. 4 is a diagram schematically illustrating the cooling arrangement of FIG. 3 when operated in an energy recuperation mode.

The cooling arrangement 200 may further comprise additional devices as essentially known in the art. For example, a heat transfer fluid cooling element may be arranged downstream the one or more devices 300 to be cooled. For example, and as illustrated in FIG. 4, a heat exchanger 210, such as a heat exchanger 210 arranged at the front of a truck, may be present downstream the one or more devices 300 to be cooled. Thus, the heat transfer fluid which when used for cooling the one or more devices 300 will itself be heated, may thereafter be cooled by the heat exchanger 210. In another example, a pump 220 may be arranged to assist the transfer fluid flow in the cooling arrangement 200.

As intimated in the above, when in use, the cooling system 1000 may operate in two different modes: an energy recuperation mode and a cooling mode.

The energy recuperation mode is a method for energy storage of recuperation energy from an energy recuperating arrangement in a vehicle, comprising:

using the recuperation energy for driving the fluid flow control assembly 30 to provide a heat transfer fluid flow from the first volume V1 to the second volume V2 of the storage tank 10 and using the recuperation energy for driving the heat transfer arrangement 40 to cool the heat transfer fluid.

FIG. 4 illustrates the cooling arrangement 1000 of FIG. 3 when operating in the energy recuperation mode.

Operating the cooling system 1000 in the energy recuperation mode results relatively warm heat transfer fluid (complete arrows) flowing past the heat transfer arrangement 40 such that relatively cool heat transfer fluid (dashed arrows) is stored in the second volume V2 and the partition 12 of the energy storage tank 10 moves towards the maximum energy storage position.

The cooling mode is a method for cooling the one or more devices 300 in the cooling system 200 and comprises allowing transfer fluid flow between the energy storage system 100 and the cooling system 200 so as to cool the one or more devices 300.

Figure 5:
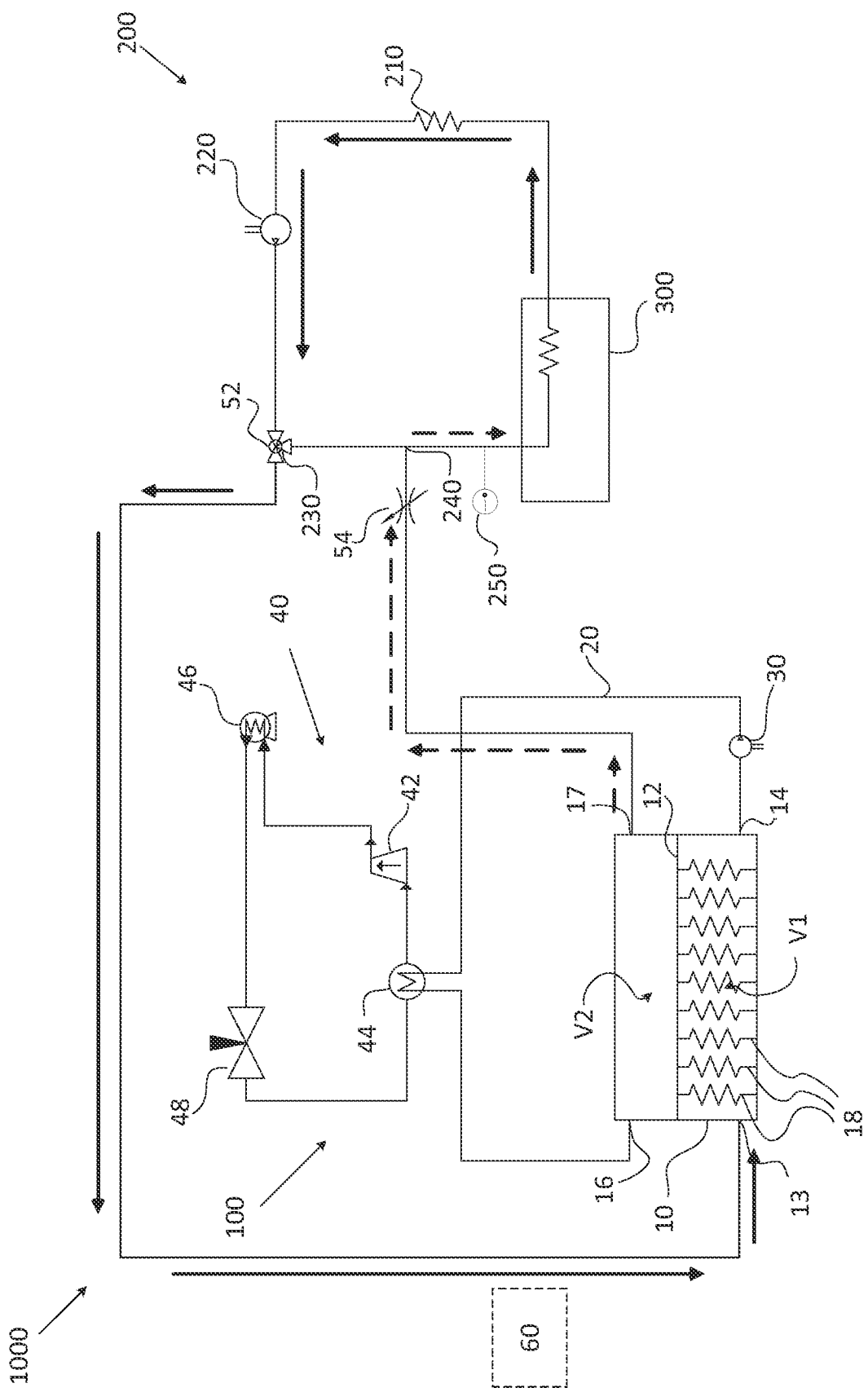
FIG. 5 is a diagram schematically illustrating the cooling arrangement of FIG. 4 when operated in a cooling mode.

FIG. 5 illustrates the cooling arrangement 1000 of FIG. 3 when operating in the cooling mode.

Operating the cooling system 1000 in the cooling mode results in relatively cool heat transfer fluid (dashed arrows) flowing to the cooling system 200 past the one or more devices 300 for cooling thereof. Relatively warm heat transfer fluid (complete arrows) is stored in the first volume V1 of the tank 10 and the partition 12 of the energy storage tank 10 moves towards the minimum energy storage position.

Control of the cooling mode operation involves controlling the valve arrangement 52, 54 to allow flow of heat transfer fluid between the energy storage system 100 and the cooling system 200 to provide the cooling mode and controlling the valve arrangement 52, 54 to hinder flow of heat transfer fluid between the energy storage system 100 and the cooling system 200 to hinder the cooling mode.

The control of the valve arrangement 52, 54 may for example use a request for cooling of the one or more devices 300 as an input. Further, the control of the valve arrangement may use an indication that cooled transfer fluid is available as input. For example, the control of the valve arrangement may use a location of the partition 12 in the storage tank 10 as an input.

Control of the energy storage mode may comprise controlling the fluid flow control means 30 and/or the heat transfer arrangement 40, as explained in the above.

Thus, recuperated energy from an event in a vehicle, such as a braking event may be stored until there is a need for cooling the one or more devices 300.

Other options and alternatives of the systems, arrangements and methods as described herein may be envisaged by those skilled in the art.

For example, the energy storage system may comprise a sensor for determining the position of the partition 12 in the tank. A signal from such a sensor may be used as input for controlling the energy storage system. For example, when the partition 12 is at the maximum energy storage position, the cooling state may be initiated.

For example, and as illustrated in FIGS. 3 to 5, the cooling system 200 may comprise a temperature sensor 250 for sensing the temperature of the cooling fluid before reaching the device 300 to be cooled. Based on the temperature sensed by the sensor 250, a request for cooling of the device 300 may be made. Thus, the operation of the cooling arrangement 1000 may be controlled. Other sensors such as temperature sensors and/or flow sensors may be applied in different variants.

Also, the arrangement of the flow conduits for the transfer fluid may be varied. For example, in FIGS. 3 to 5, the storage tank 10 is provided with a first volume outlet 14 and a second volume inlet 16 connected to the transfer fluid duct 20. In addition, the storage tank is provided with a second volume outlet 17 and a first volume inlet 13 for connection to the cooling system 200.

However, in other variants, different arrangements of conduits for the heat transfer fluid and/or inlets/outlets to the heat transfer tank 1 may be envisaged, optionally using valves controllable to arrive at the desired fluid flows.

The invention claimed is:

1. An energy storage system for a vehicle comprising:
an energy storage tank defining a tank volume for a heat transfer fluid and comprising a partition dividing the tank volume into a first volume and a second volume, wherein the partition is movable to/from any position between a minimum energy storage position corresponding to a minimum second volume, and a maximum energy storage position corresponding to a maximum second volume;
wherein the energy storage tank further comprises a biasing device arranged such that movement of the partition away from the minimum energy storage position corresponds to storing energy in the biasing device, and movement towards the minimum energy storage position corresponds to releasing energy from the biasing device; and
the energy storage system further comprises:
a heat transfer fluid duct connecting the first volume and the second volume; and a heat transfer arrangement configured to alter a temperature of the heat transfer fluid from a first temperature when in the first volume to a second temperature when in the second volume, wherein the heat transfer arrangement is a cooling arrangement for cooling the heat transfer fluid; and
a fluid control assembly for providing a pressure inducing a flow of the heat transfer fluid from the first volume to the second volume via the heat transfer fluid duct.

2. The energy storage system of claim 1, wherein the heat transfer arrangement is arranged along the heat transfer fluid duct.

3. The energy storage system of claim 1, wherein the fluid control assembly comprises a pump and/or an actuator.

4. The energy storage system of claim 1, further comprising a control unit adapted to control the fluid control assembly and/or heat transfer arrangement.

5. A vehicle comprising the energy storage system of claim 1, wherein the fluid control assembly is configured to be driven by recuperated energy from a braking arrangement of the vehicle.

6. The energy storage system of claim 1, wherein the fluid control assembly and/or heat transfer arrangement are configured to be driven by recuperated energy from an energy recuperating arrangement.

7. The energy storage system of claim 6, wherein the energy recuperating arrangement is a braking arrangement.

8. The energy storage system of claim 1, wherein the heat transfer arrangement comprises one or more cooling elements.

9. The energy storage system of claim 8, wherein at least one cooling element of the one or more cooling elements is a compressor for cooling the heat transfer fluid.

10. The energy storage system of claim 1, wherein the cooling arrangement further comprises:
a cooling system for cooling one or more devices using the heat transfer fluid; and
a valve arrangement for controlling a flow of the heat transfer fluid from the second volume to the first volume via the cooling system.

11. The energy storage system of claim 10, wherein:
the cooling system further comprises a cooling system fluid duct connecting the second volume and the first volume,
the one or more devices is arranged along the cooling system fluid duct, and
the cooling system fluid duct is at least partly separate from the heat transfer fluid duct.

12. A method for cooling one or more devices in the energy storage system of claim 10, comprising:
controlling the valve arrangement to allow flow of the heat transfer fluid from the second volume to the first volume of the energy storage system via the cooling system.

13. A method for controlling the cooling arrangement of the energy storage system of claim 10, comprising:
when recuperation energy from an energy recuperating arrangement is available, operating the cooling arrangement in an energy recuperation mode by:
driving the fluid flow assembly to provide a heat transfer fluid flow from the first volume to the second volume utilizing the recuperation energy; and/or
driving the heat transfer arrangement to alter the temperature of the heat transfer fluid, wherein the second temperature is lower than the first temperature utilizing the recuperation energy; and
when a need for cooling the one or more devices is present, operating the cooling arrangement in a cooling mode by controlling the valve arrangement to allow flow of heat transfer fluid from the second volume to the first volume of the energy storage system via the cooling system.

14. A vehicle comprising the energy storage system of claim 10, wherein the cooling arrangement is configured to be driven by recuperated energy from a braking arrangement of the vehicle.

15. The energy storage system of claim 10, wherein one of the one or more devices is an electrical energy supply system.

16. The energy storage system of claim 15, wherein the electrical energy supply system is a fuel cell system and/or a battery.

17. A method for energy storage of recuperation energy from an energy recuperating arrangement in a vehicle, in the energy storage system of claim 1, the method comprising:
driving the fluid flow assembly to provide a heat transfer fluid flow from the first volume to the second volume utilizing the recuperation energy; and/or
driving the heat transfer arrangement to alter the temperature of the heat transfer fluid utilizing the recuperation energy.

18. A control unit configured for performing the method of claim 17.

19. A vehicle comprising the control unit of claim 18.

* * * * *